United States Patent
Castellón Mora et al.

(10) Patent No.: US 10,966,430 B2
(45) Date of Patent: *Apr. 6, 2021

(54) NATURAL FUNGICIDE COMPOSITION

(71) Applicant: GRIFFITH FOODS INTERNATIONAL INC., Alsip, IL (US)

(72) Inventors: Clevis Castellón Mora, Cartago (CR); Arianna Aronne Sparisci, San José (CR)

(73) Assignee: GRIFFITH FOODS INTERNATIONAL INC., Alsip, IL (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/030,482

(22) Filed: Jul. 9, 2018

(65) Prior Publication Data

US 2018/0310570 A1 Nov. 1, 2018

Related U.S. Application Data

(63) Continuation-in-part of application No. 14/213,298, filed on Mar. 14, 2014.

(60) Provisional application No. 61/784,032, filed on Mar. 14, 2013.

(51) Int. Cl.

| | |
|---|---|
| *A01N 65/22* | (2009.01) |
| *A01N 25/04* | (2006.01) |
| *A01N 65/24* | (2009.01) |
| *A01N 65/40* | (2009.01) |
| *A01N 65/00* | (2009.01) |
| *A01N 65/42* | (2009.01) |

(52) U.S. Cl.
CPC ............ *A01N 65/22* (2013.01); *A01N 25/04* (2013.01); *A01N 65/00* (2013.01); *A01N 65/24* (2013.01); *A01N 65/40* (2013.01); *A01N 65/42* (2013.01)

(58) Field of Classification Search
None
See application file for complete search history.

(56) References Cited

U.S. PATENT DOCUMENTS

| | | |
|---|---|---|
| 6,231,865 B1 | 5/2001 | Hsu et al. |
| 2005/0244445 A1 | 11/2005 | Anderson |
| 2007/0251020 A1 | 11/2007 | Stockman et al. |
| 2008/0233202 A1 | 9/2008 | Wurms et al. |
| 2010/0247684 A1 | 9/2010 | Reid et al. |
| 2010/0297244 A1 | 11/2010 | Khopade et al. |
| 2011/0268780 A1 | 11/2011 | Markus et al. |

FOREIGN PATENT DOCUMENTS

| | | |
|---|---|---|
| EP | 0594319 A1 | 4/1994 |
| WO | 2004098767 A1 | 11/2004 |
| WO | 2011140309 A2 | 11/2011 |

OTHER PUBLICATIONS

Castellon, Clevis, "Assessments of vegetable oils in order to control the Black Sigatoka (Mycosphaerella fijiensis)," thesis for Universidad Nacional Costa Rica, School of Agricultural Sciences, 2010, 46 pages total, with English translation.
International Search Report and Written Opinion of the ISA/US issued in related application PCT/US2014/028812, dated Aug. 7, 2014, 7 pages.
Morales, A., "Plant fungicides, natural effectiveness," <http://www.enbuenasmanos.com/articulos/muestra.asp?art=2347>, 2009, 5 pages with English translation.
Stauffer B., A., et al., "Selection of Plant Extracts with Fungicidal and/or Bactericidal Effects," Revista de Ciencia y Tecnologia Dirección de Investigaciones—UNA, 2000, 1(2):29-33, English abstract only.
Viveros Folleco, J., et al., "In Vitro Evaluation of Plant Extracts on Mycosphaerella fijiensis Morelet," Agronomia (Manizales), 2006, 14(1):37-50, English abstract only.
Alvindia, "Inhibitory influence of biocontrol agents, plant oils and an inorganic salt on Mycosphaerella fijiensis and Cordana musae, the causal pathogen of black sigatoka and leaf spot of banana," African J Microbiology Research, 2012, 6(19): 4179-4184.
Indian Patent Office Examination Report for Application No. 6037/CHENP/2015 dated Nov. 7, 2018 (7 pages).
Indonesian Patent Office Action for Application No. P-00201506473 dated Jan. 16, 2019 (3 pages, statement of relevance included).

*Primary Examiner* — Terry A McKelvey
*Assistant Examiner* — Catheryne Chen
(74) *Attorney, Agent, or Firm* — Brinks Gilson & Lione

(57) ABSTRACT

A method for treating Black Sigatoka fungus in crops of the Musaceae family by applying a fungicidal composition comprising garlic oil, rosemary oil, thyme oil and cinnamon oil.

15 Claims, No Drawings

NATURAL FUNGICIDE COMPOSITION

CROSS-REFERENCE TO RELATED PATENT APPLICATIONS

This patent application claims the benefit of U.S. patent application Ser. No. 14/213,298, filed on Mar. 14, 2014, which claims the benefit of U.S. Provisional Patent Application No. 61/784,032, filed on Mar. 14, 2013.

FIELD

This invention pertains to natural fungicides for edible and ornamental crops of the Musaceae family and particularly for bananas and plantain crops. These natural fungicides are also believed to be useful generally as fungicides for plants that thrive in warm and moist environments that are vulnerable to fungal diseases.

BACKGROUND

Bananas (*Mussa* spp) are one of the most important export products in Central America and elsewhere in the world. In banana and other related crops, fungi and bacteria can cause severe losses.

One of the main plant pathology problems that limit banana production in Central America is Black Sigatoka which is caused by the fungus *Mycospharella fijiensis* Morelet. This disease of Black Sigatoka produces rapid deterioration of the plant leaves, affecting plant growth by decreasing photosynthetic capacity and reducing fruit quality.

Black Sigatoka is caused by the Ascomycete fungus, *Mycosphaerella fijiensis*, which is sexually and asexually produced during its life cycle. The asexual phase occurs early in the disease, in which a low number of conidiophores emerge from the stomata. The sexual phase produces a large number of ascospores, which are responsible for the spread of the disease by the wind. It can cause significant reductions in leaf area, yield losses of 50% or more and premature ripening, resulting in significant crop losses.

Currently, the most commonly used fungicides used in treating Black Sigatoka are dithiocarbamate and chlorothalonil. These synthetic products act on leaf surfaces to form a layer to impede fungi penetration. Systemic synthetic fungicides such as benzimidazoles and triazoles are also used.

It is highly desirable to use natural fungicides where possible to control fungi growth in plants since the natural fungicides are more environmentally friendly than conventional synthetic chemical fungicides and are preferred by both farmers and consumers. Since crops raised in warm, moist tropical environments are particularly subject to fungal growth, they require the application of substantial amounts of fungicides, making the use of natural fungicides even more desirable for environmental reasons.

While spices and herbs have been used in the past to inhibit bacteria, yeast and mold in crops, no natural composition has heretofore been discovered or disclosed which is as effective as conventional synthetic chemicals in controlling fungal growth in edible and ornamental crops of the Musaceae family or generally in plants that thrive in warm and moist environments that are vulnerable to fungal diseases. Therefore, if natural fungicides that are as effective as conventional chemicals in controlling fungal growth in edible and ornamental crops of the Musaceae family or generally in plants that thrive in warm and moist environments that are vulnerable to fungal diseases could be found this would bring important environmental and safety advantages.

SUMMARY

Embodiments comprise a composition containing spice essential oils and extracts dispersed in palm olein (or less preferably other vegetable oils), preferably containing antioxidants that prevent rancidity, and preferably also including an emulsifier to keep the product shelf stable and to aid in dispersion when it is diluted with water before application.

Embodiments of the natural fungicide may contain the following components:
garlic oil preferably obtained by steam distillation of bulbs of garlic *Allium sativum* L.
rosemary oil obtained by steam distillation of rosemary leaves, *Rosmarinus officinalis* L.
thyme oil extracted from thyme, *Thymus vulgaris*.
cinnamon oil distilled from the bark of *Cinnamomum zeylanicum*.
a blend of Butylated Hydroxytoluene (BHT) and Butylated hydroxyanisole (BHA) as an antioxidant. Other appropriate antioxidants can be used.
polysorbate as an emulsifier. Other appropriate emulsifiers such as propylene glycol alginate can be used.
xanthan gum as a suspension agent and emulsifier.
Concentration (% by weight) in natural fungicide composition embodiments (before dilution for application):
palm olein: about 50.0-80.0%
emulsifier: about 10.0-40.0%
garlic oil: about 2.0-5.0%
rosemary oil: about 0.5-2.5%
thyme oil: about 0.5-2.5%
cinnamon oil: about 0.5-2.5%
xanthan gum: less than about 1%
antioxidant blend: about 0-0.5%.
Optional ingredients:
spearmint oil and/or peppermint oil at a level of from about 0.5 wt. % to about 3 wt. % and preferably from about 1.0 wt. % to about 2.5 wt. % to give the composition a pleasant odor. Perhaps more importantly, it is also believed that the addition of spearmint and/or peppermint oils to the fungicidal composition enables them to be used to treat edible and ornamental crops of the Musaceae family to provide significant protection against other fungi, such as *Phytophthora*.
mineral oil at an appropriate level to act as a fungistatic agent.
soy lecithin at a level from about 1.5 wt. % to about 3 wt. % and preferably about 2.5 wt. % to improve adhesion of the natural fungicide to the surface of the plant, to enable the fungicide to successfully resist being washed away by water from rain or irrigation striking fungicide-treated banana leaves and other parts of the banana plant.

DETAILED DESCRIPTION

The following examples further illustrate embodiments of the invention but should not be construed as in any way limiting its scope.

First Field Trials

Generally, commercial application of the natural fungicide embodiments will be by aerial spraying using aircraft or helicopters. Therefore, in this example, a natural fungicide composition in accordance with embodiments was applied on a field by nebulization, simulating aerial application. The natural fungicide used in this example was initially in the form of a composition containing, in percentages by weight:

palm olein: 74.500
emulsifier: 20.000
garlic oil: 2.000
rosemary oil: 0.500
thyme oil: 0.500
cinnamon oil: 0.500
xanthan gum: 0.500
antioxidant blend: 0.250
spearmint oil: 1.250.

Hydraulic sprayers were used to mix the concentrate natural fungicide with water and mineral oil, and thereby form aqueous droplets that are sprayed on the leaf surface. The fungicide was diluted in water and mineral oil to obtain the different concentrations before spraying to deliver from 2 to 4 liters of the natural fungicide composition per hectare of banana plantation.

After different trials, the optimal application level was found to be 4 liters per hectare with approximately 32 applications per year. It is currently believed that the application level per hectare based on actives should be about 2 to 5 liters (1.8 to 9 kg) of the natural fungicide and about 2 to 7 liters of mineral oil per hectare. And, results can be optimized through synergistic action with systemic treatments and modifications to standard soil fertilization routines.

In this example, the application of 2 to 4 liters of the natural fungicide composition per hectare of banana plantation or 3.7 kg of the natural fungicide composition per hectare substantially prevented the formation of germinative tubes of Black Sigatoka (i.e., leaf damage according to the Stover scale). It is expected that the total number of applications necessary will vary depending weather conditions (rain amount, temperature, etc.), during the growing stage of the fruit.

First Field Trial Results

Fungicidal results were obtained by measuring leaf damage according to the Stover leaf damage severity scale, modified by Gauhl, on a scale of 0 to 6 obtained by applying the following compositions in an experimental banana plantation over a period of 15 weeks:

Application of natural fungicide composition as described above.
Application of recognized synthetic chemical fungicide.
Application of mineral oil.
No treatment applied.

At a concentration of 4 liters/hectare, the natural fungicide composition produced results against Black Sigatoka fungus commensurate with the results obtained with a recognized synthetic chemical fungicide, Dithane® 60SC, which is available from Dow Agrosciences (generic name of the active ingredient is mancozeb).

The results for mineral oil alone were substantially inferior to those obtained with the natural fungicide. When no treatment was applied, the level of leaf damage was yet worse.

The results thus indicate that the experimental natural composition performs as a protectant fungicide as effectively as conventional chemical fungicides.

Second Field Trials

Additional field trials were conducted to evaluate the in vitro fungicidal activity of 14 composition embodiments in the treatment of *Mycosphaerella fijiensis*.

Culture media comprising 2% water-agar (Difco® Bacto® Agar) and 0.001, 0.01, 0.1, 1, 10, 100, and 1,000 mg/L of the active substance were each prepared in a petri dish for each composition. A separate culture media without any active substance was used as a control. For comparative fungicides F-11-01 to F-11-12 listed in Table 1 below, the active substance was the same as the composition as a whole.

TABLE 1

| Comparative Fungicide | Active Substance/ Composition |
|---|---|
| F-11-01 | Palm Oil |
| F-11-02 | Garlic Oil |
| F-11-03 | Rosemary Oil |
| F-11-04 | Thyme Oil |
| F-11-05 | Cinnamon Oil |
| F-11-06 | Spearmint Extract |
| F-11-07 | Peppermint Oil |
| F-11-08 | Antioxidant (BHA-BHT) |
| F-11-09 | Polysorbate 80 |
| F-11-10 | Soy Lecithin |
| F-11-11 | Propylene Glycol Alginate |
| F-11-12 | Mint Oil |

For sample fungicides F-11-13 and F-11-14, the active substance had the composition shown in Table 2 below. Sample fungicide F-11-13 was prepared at the time that the second field trials were conducted, but sample fungicide F-11-14 had been prepared about a year before the second field trials were conducted and held in storage until the second field trials were undertaken.

TABLE 2

| Inventive Formula | wt. % |
|---|---|
| Palm Oil | 59.125 |
| Garlic Oleoresin | 2.000 |
| Rosemary Oil | 0.500 |
| Thyme Oil | 0.500 |
| Cinnamon Oil | 0.500 |
| Spearmint Extract | 1.250 |
| Antioxidant (BHA-BHT) | 0.250 |
| Polysorbate 80 | 32.000 |
| Soy Lecithin | 2.500 |
| Propylene Glycol Alginate | 0.125 |
| Mint Oil | 1.250 |
|  | 100.000 |

Ascospores of *Mycosphaerella fijiensis* obtained from a banana plantation that had not been treated with any fungicides were discharged into each petri dish. After discharging the ascospores of *Mycosphaerella fijiensis*, each sample was incubated for 48 hours at 26° C. in complete darkness. After 48 hours of incubation, the length of 100 germinated ascospores at each concentration was measured.

After collecting the data, the average length of the germinated ascospores was calculated for each concentration. The average inhibition percentage was calculated for each sample fungicide at each concentration using the following formula:

$$\% \text{ inhibition} = \left(\frac{\overline{L}_{control} - \overline{L}_{sample}}{\overline{L}_{control}}\right) \times 100\%$$

where:

$\overline{L}_{control}$=average length of germinated ascospores of control sample $\overline{L}_{sample}$=average length of germinated ascospores of sample fungicide.

The average inhibition percentage was used to calculate $EC_{50}$ for each sample fungicide. $EC_{50}$ is the half maximal effective concentration, which refers to the concentration of sample fungicide that induces a response halfway between the baseline and maximum after a specified exposure time.

Second Field Trial Results

The results for each sample fungicide are summarized in Table 3 below. A lower $EC_{50}$ value is desirable because it indicates that the sample fungicide was able to achieve 50% inhibition using a lower concentration of the active ingredient as compared to sample fungicides with higher $EC_{50}$ values.

TABLE 3

| Fungicides | Concentration (mg/L) | % Inhibition | Natural Log | $EC_{50}$ | $R^2$ Value |
|---|---|---|---|---|---|
| Comparative Fungicide F-11-01 (Palm Oil) | 0.001 | −5.06 | 7.27 | >1000 | 0.78 |
| | 0.01 | 10.6 | | | |
| | 0.1 | 26.51 | | | |
| | 1 | 37.59 | | | |
| | 10 | 38.67 | | | |
| | 100 | 43.49 | | | |
| | 1000 | 36.99 | | | |
| Comparative Fungicide F-11-02 (Garlic Oil) | 0.001 | −9.64 | 1.2 | 3.33 | 0.75 |
| | 0.01 | −10.48 | | | |
| | 0.1 | −1.45 | | | |
| | 1 | −12.77 | | | |
| | 10 | 99.28 | | | |
| | 100 | 100 | | | |
| | 1000 | 100 | | | |
| Comparative Fungicide F-11-02 (Rosemary Oil) | 0.001 | 21.69 | 1.92 | 6.81 | 0.55 |
| | 0.01 | 33.37 | | | |
| | 0.1 | 31.57 | | | |
| | 1 | 38.55 | | | |
| | 10 | 29.04 | | | |
| | 100 | 43.25 | | | |
| | 1000 | 100 | | | |
| Comparative Fungicide F-11-04 (Thyme Oil) | 0.001 | 9.64 | 4.84 | 127.6 | 0.51 |
| | 0.01 | −8.8 | | | |
| | 0.1 | 2.05 | | | |
| | 1 | −9.4 | | | |
| | 10 | −8.92 | | | |
| | 100 | 58.07 | | | |
| | 1000 | 100 | | | |
| Comparative Fungicide F-11-05 (Cinnamon Oil) | 0.001 | 18.43 | 1.15 | 3.18 | 0.75 |
| | 0.01 | 5.06 | | | |
| | 0.1 | 7.35 | | | |
| | 1 | 23.73 | | | |
| | 10 | 37.11 | | | |
| | 100 | 100 | | | |
| | 1000 | 100 | | | |
| Comparative Fungicide F-11-06 (Spearmint Oil) | 0.001 | −10.94 | 3.71 | 41.06 | 0.74 |
| | 0.01 | 9.33 | | | |
| | 0.1 | 18.35 | | | |
| | 1 | 16.42 | | | |
| | 10 | 17.27 | | | |
| | 100 | 40.56 | | | |
| | 1000 | 100 | | | |
| Comparative Fungicide F-11-07 (Peppermint Oil) | 0.001 | −8.48 | 3.73 | 41.59 | 0.8 |
| | 0.01 | −16.85 | | | |
| | 0.1 | −2.47 | | | |
| | 1 | −4.83 | | | |
| | 10 | 21.14 | | | |
| | 100 | 58.91 | | | |
| | 1000 | 100 | | | |
| Comparative Fungicide F-11-08 (Antioxidant (BHA-BHT)) | 0.001 | 1.61 | 3.15 | 23.32 | 0.77 |
| | 0.01 | 32.4 | | | |
| | 0.1 | 5.58 | | | |
| | 1 | 18.24 | | | |
| | 10 | 48.93 | | | |
| | 100 | 56.33 | | | |
| | 1000 | 77.68 | | | |
| Comparative Fungicide F-11-09 (Polysorbate 80) | 0.001 | 37.98 | 10.45 | >1000 | 0.11 |
| | 0.01 | 42.6 | | | |
| | 0.1 | 11.91 | | | |
| | 1 | 31.87 | | | |
| | 10 | 52.04 | | | |

TABLE 3-continued

| Fungicides | Concentration (mg/L) | % Inhibition | Natural Log | $EC_{50}$ | $R^2$ Value |
|---|---|---|---|---|---|
| | 100 | 46.24 | | | |
| | 1000 | | | | |
| Comparative Fungicide F-11-10 (Soy Lecithin) (ND: The soy lecithin was unable to be dissolved in any of the three solvents evaluated: water, acetone, and methanol.) | 0.001 0.01 0.1 1 10 100 1000 | ND | ND | ND | ND |
| Comparative Fungicide F-11-11 (Propylene Glycol Alginate) | 0.001 0.01 0.1 1 10 100 1000 | 39.06 34.44 35.84 30.58 −1.5 32.3 97.85 | 5.57 | 1.13 | 0.12 |
| Comparative Fungicide F-11-12 (Soybean Oil) | 0.001 0.01 0.1 1 10 100 1000 | −4.819 −6.627 4.217 7.952 2.892 4.096 −3.855 | 138.54 | >1000 | 0.1 |
| Sample Fungicide F-11-13 (produced for trials) | 0.001 0.01 0.1 1 10 100 1000 | 5.36 8.69 19.42 27.25 29.72 75.21 99.03 | 1.85 | 6.37 | 0.85 |
| Sample Fungicide F-11-14 (produced more than 1 year before trials) | 0.001 0.01 0.1 1 10 100 1000 | 37.88 47.42 42.6 46.57 47.42 47.64 88.41 | −0.46 | 0.62 | 0.52 |

The fungicides with higher activity were: F-11-14 (the aged formula, $EC_{50}$=0.62 mg/L), F-11-11 (Propylene Glycol Alginate, $EC_{50}$=1.13 mg/L), F-11-05 (Cinnamon Oil, $EC_{50}$=3.18 mg/L), and F-11-02 (Garlic Oil, $EC_{50}$=3.3 mg/L). Fungicides F-11-01 (Palm Oil), F-11-09 (Polysorbate 80), and F-11-12 (Soy Lecithin) each had $EC_{50}$>1,000 mg/L, which means that none of these samples was able to achieve 50% inhibition at the highest concentration (1,000 mg/L) evaluated.

The lowest inhibiting concentration, that is, the minimum concentration that achieves total (100%) inhibition of the germinated ascospores was 100 mg/L for F-11-02 (Garlic Oil) and F-11-05 (Cinnamon Oil) and 1,000 mg/L for F-11-03 (Rosemary Oil), F-11-04 (Thyme Oil), F-11-06 (Spearmint Extract), and F-11-07 (Mint Oil). The lowest inhibiting concentration could not be determined for the remaining sample fungicides because none of those achieved total inhibition at the concentrations that were evaluated.

The $EC_{50}$ for sample fungicide F-11-13 was 6.4 ppm. Table 4 below shows the amount of each component of sample fungicide F-11-13 at a total concentration of 6.4 ppm.

TABLE 4

| F-11-13 | wt. % | ppm |
|---|---|---|
| Palm Oil | 59.125 | 3.784 |
| Garlic Oleoresin | 2.000 | 0.128 |
| Rosemary Oil | 0.500 | 0.032 |

TABLE 4-continued

| F-11-13 | wt. % | ppm |
|---|---|---|
| Thyme Oil | 0.500 | 0.032 |
| Cinnamon Oil | 0.500 | 0.032 |
| Spearmint Extract | 1.250 | 0.080 |
| Antioxidant (BHA-BHT) | 0.250 | 0.016 |
| Polysorbate 80 | 32.000 | 2.048 |
| Soy Lecithin | 2.500 | 0.160 |
| Propylene Glycol Alginate | 0.125 | 0.008 |
| Mint Oil | 1.250 | 0.080 |
| | 100.000 | 6.400 |

The unexpected synergistic effect of combining garlic oil, rosemary oil, thyme oil, and cinnamon oil to produce a natural fungicide to eradicate Black Sigatoka is evident from the Second Field Results. The results show that significantly lower amounts of garlic oil, rosemary oil, thyme oil, and cinnamon oil were used in combination in sample fungicides F-11-13 and F-11-14 to achieve 50% inhibition as compared to the higher amounts required for each of garlic oil, rosemary oil, thyme oil, and cinnamon oil when used alone as a fungicide.

In addition, the results show that storing the fungicidal composition (e.g., F-11-14) for more than one year does not adversely affect its fungicidal activity. Surprisingly, the fungicidal activity of F-11-14 increased and its $EC_{50}$ was 0.62 ppm. Without being bound by theory, the greater fungicidal activity of the F-11-14 is believed to result from secondary metabolites that are created during storage.

The embodiments disclosed here provide further fungicidal compositions that are expected to produce as good or better results than the embodiments disclosed in U.S. patent application Ser. No. 14/213,298. The differences between the embodiments disclosed here and the embodiments of U.S. patent application Ser. No. 14/213,298 include:

increased the amount of emulsifier by about 50% or more
added soy lecithin improving adhesion of the natural fungicide to the surface of the plant
added peppermint oil, which together with spearmint oil, is believed to provide significant protection against other fungi, such as *Phytophthora*
decreased the palm olein All references are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the ranges, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. The illustrated embodiments are exemplary only, and should not be taken as limiting the scope of the invention.

What is claimed is:

1. A method for treating Black Sigatoka fungus in crops of the Musaceae family comprising:
    applying a fungicidal composition to the crops comprising an emulsifier, garlic oil, rosemary oil, thyme oil and cinnamon oil in the following percentages by weight:
    emulsifier: about 10.0-40.0%
    garlic oil: about 2.0-5.0%
    rosemary oil: about 0.5-2.5%
    thyme oil: about 0.5-2.5%
    cinnamon oil: about 0.5-2.5%
    peppermint oil: about 0.5-3%.

2. The method of claim 1 in which the garlic oil, rosemary oil, thyme oil and cinnamon oil of the fungicidal composition are dispersed in a vegetable oil.

3. The method of claim 2 in which the vegetable oil is palm olein.

4. The method of claim 2 in which the fungicidal composition includes an emulsifier selected from the group consisting of polysorbate, propylene glycol alginate, and mixtures thereof.

5. The method of claim 4 in which the emulsifier is about 32 wt. % polysorbate and 0.125 wt. % propylene glycol alginate.

6. The method of claim 1 in which the fungicidal composition includes an antioxidant.

7. The method of claim 1 in which the fungicidal composition includes xanthan gum.

8. The method of claim 1 in which the fungicidal composition includes spearmint oil.

9. The method of claim 1 in which mineral oil is included in the fungicidal composition at an appropriate level to act as a fungistatic agent.

10. The method of claim 1 in which the fungicidal composition includes, in percentages by weight:
    palm olein: 59.125
    garlic oil: 2.000
    rosemary oil: 0.500
    thyme oil: 0.500
    cinnamon oil: 0.500
    polysorbate: 32.000
    propylene glycol alginate: 0.125
    antioxidant blend: 0.250
    spearmint oil: 1.250
    peppermint oil: 1.250
    soy lecithin: 2.500.

11. The method of claim 1 in which the fungicidal composition is applied to banana crops.

12. The method of claim 11 in which the fungicidal composition is applied by aerial spraying.

13. A method for treating Black Sigatoka fungus in crops of the Musaceae family comprising applying to the crops a composition containing, in percentages by weight:
    palm olein: about 50.0-80.0%
    emulsifier: about 10.0-40.0%
    garlic oil: about 2.0-5.0%
    rosemary oil: about 0.5-2.5%
    thyme oil: about 0.5-2.5%
    cinnamon oil: about 0.5-2.5%
    antioxidant blend: about 0-0.5%
    peppermint oil: about 0.5-3%.

14. The method of claim 1 in which the fungicidal composition further includes, in percentage by weight:
    soy lecithin: about 1.5-3%.

15. The method of claim 13 in which the fungicidal composition further includes, in percentage by weight:
    soy lecithin: about 1.5-3%.

* * * * *